350-169. SR
01-09-73 XR 3,710,010

United States Patent [19]
Balliett et al.

[11] 3,710,010
[45] Jan. 9, 1973

[54] REFLECTIVE DEVICE FOR COLOR SEPARATION

[75] Inventors: John W. Balliett; William T. Sherwood, both of Rochester, N.Y.

[73] Assignee: Eastman Kodak Company, Rochester, N.Y.

[22] Filed: July 1, 1971

[21] Appl. No.: 158,758

Related U.S. Application Data

[63] Continuation-in-part of Ser. No. 76,935, Sept. 30, 1970, abandoned.

[52] U.S. Cl. .............178/5.4 R, 178/5.4 E, 350/293, 350/169

[51] Int. Cl. .............................................H04m 9/02

[58] Field of Search.....178/7.87, 5.4 E, 5.2 R, 5.4 R; 356/32; 350/169, 171, 172, 288, 296, 299, 97

[56] References Cited

UNITED STATES PATENTS

| | | | |
|---|---|---|---|
| 2,560,351 | 7/1951 | Kell et al. | 178/5.2 R |
| 2,703,506 | 3/1955 | Kelly | 350/169 |
| 2,017,190 | 10/1935 | Waide | 350/169 |

*Primary Examiner*—Robert L. Griffin
*Assistant Examiner*—Donald E. Stout
*Attorney*—W. H. J. Kline et al.

[57] ABSTRACT

An image is focused upon a reflective device having a plurality of arcuate reflective surfaces, each surface being operative to reflect a portion of the image upon an associated photosensitive device. In particular, three photosensitive devices, each sensitive for example to a primary color of red, green or blue, and three arcuate reflective surfaces are arranged to translate the respective red, green and blue color components of an image focused upon the arcuate reflective surfaces into signals indicative thereof.

4 Claims, 2 Drawing Figures

JOHN W. BALLIETT
WILLIAM T. SHERWOOD
INVENTORS
BY Joseph L. Breimayer
W. H. J. Kline
ATTORNEYS

REFLECTIVE DEVICE FOR COLOR SEPARATION

CROSS-REFERENCE TO RELATED APPLICATIONS

This is a continuation-in-part of my earlier filed application Ser. No. 76,935, filed Sept. 30, 1970, now abandoned.

BACKGROUND OF THE INVENTION

1. Field of the Invention

This invention relates to the separation of light from an image into its color components for the production of signals representative of the intensity of each color component.

2. Description of the Prior Art

The translation of color light images, either real or recorded, as on motion picture film, into electrical signals suitable for measurement purposes or for the display of the color light images has long been practices through the use of optical-to-electrical signal transducer apparatus such as photomultiplier tubes and/or photosensitive semiconductor apparatus.

Recognizing that the color of an object may be recreated by a mixture of red, green and blue light, it has been a common practice in the prior art of transmitting color images as electrical signals to separate the color light image into the red, green and blue color components of the image and to translate the intensity of each of the separated color components into an intensity electrical signal. A display of the color image of the object may then be recreated at a remote location by the translation of the respective electrical signals into their respective color components and the combination of the color components as a recreated color image.

A primary example of this technique resides in the well-known practice of scanning the color images of motion picture film with a flying spot scanning device and simultaneously separating the light modulated by the motion picture film into its color components. In the prior art, as shown for example in U.S. Pat. Nos. 2,776,335 and 2,808,456, the modulated light is depicted as directed upon two dichroic or half-silvered mirrors situated in the path of the light that are operative to separate the modulated light into its color components and to direct the color components upon photosensitive devices that translate the intensity of each color component into an electrical signal.

A disadvantage of this arrangement for separating the modulated light into its color components resides in the fact that the dichroic or half-silvered mirrors are usually relatively expensive and bulky.

SUMMARY OF THE INVENTION

Accordingly, it is an object of the present invention to inexpensively separate the light of an image into a plurality of component images and to determine the color composition of the component images.

Furthermore, it is an object of the present invention to separate a light image into a plurality of component images and to translate the intensity of each color component of light in the component images into an electrical signal.

In accordance with these and other objects, apparatus is provided for generating signals indicative of the component wave lengths of light in a light image, the term light, in the context of the specification and claims, being defined as an electromagnetic radiation in the wave length range including infrared, visible and ultraviolet radiation. This apparatus includes means for separating the light image into a plurality of component light images each containing predetermined wave lengths of light reduced in intensity, to the intensity of the component wave lengths of light in the light image and means for directing the component light images along distinct paths onto light sensitive devices. The light responsive devices are selectively sensitive to separate predetermined component wave lengths of light in the component light images to provide signals indicative of the intensity of light within the predetermined wave lengths.

In an illustrative embodiment of this invention, the separating means may include means for projecting the light modulated by a scanned point in each film frame upon a plurality of arcuate reflective surfaces arranged with respect to the light responsive devices so that the component light images reflected by each of the arcuate surfaces is directed in a separate path through a color filter and onto a photosensitive device. If the sensitivities of the photosensitive devices to the primary colors vary with respect to the particular color, the area of the corresponding reflective surface may be varied to compensate for the difference in sensitivity.

Other objects and advantages of the invention will become apparent from the following description taken in conjunction with the accompanying drawings.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
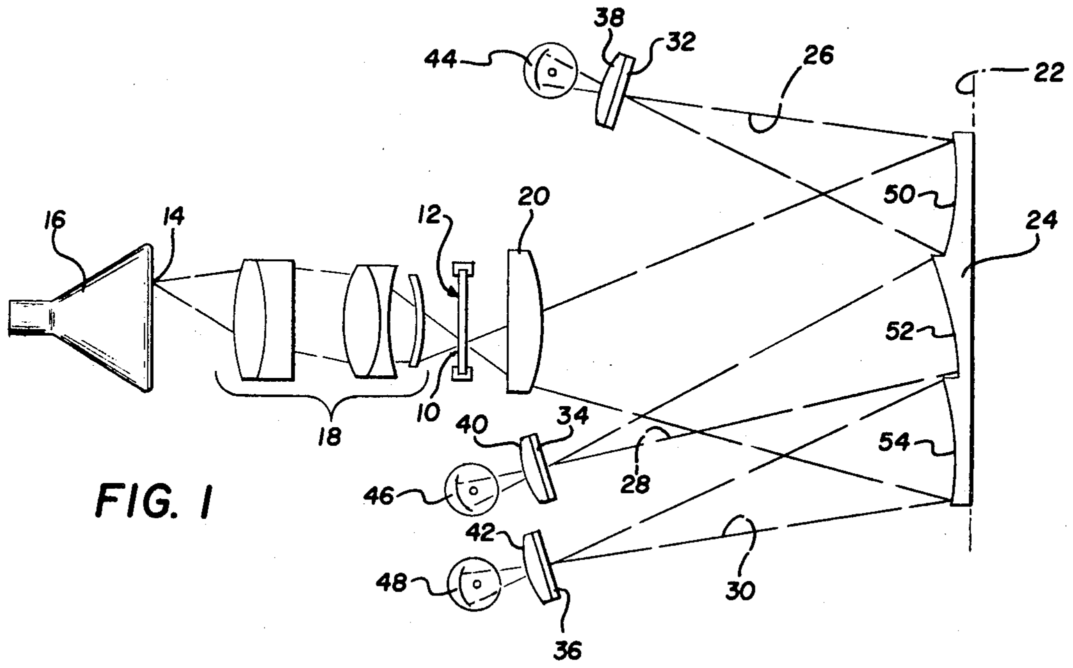
FIG. 1 is a schematic illustration of the arrangement of the separating device with respect to the photoresponsive elements in accordance with the invention.

Referring now to the drawings, and first to FIG. 1, as one preferred embodiment of the invention there is shown a separating device for determining the relative composition of the primary colors of light presented by a light image of an object. It will be understood that the elements of FIG. 1 may not be in scale but are depicted in the relationship shown in accordance with the invention. The light image, considered by way of example depicted in FIG. 1, results from the illumination of a point 10 of an information storage medium such as a frame of motion picture film 12 by a beam of light 14 generated by a flying spot scanner tube 16 and focused upon the point 10 by a lens assembly 18, as shown in the aforementioned U.S. Pat. Nos. 2,776,335 and 2,808,456. The beam of white light 14 is sharply focused by the lens assembly 18 on the point 10 of the motion picture film frame 12 and is modulated by the color content of the point 10 in the motion picture film frame. The beam of light 14 radiated from the faceplate of the flying spot scanner tube 16 is scanned in the well-known television raster pattern to sequentially illuminate each point in the film frame 12. The lens assembly 18 is similar in structure and operation to that lens assembly identified as 4 in the aforementioned U.S. Pat. No. 2,808,456. The lens 20 forms an unsharp image of the exit pupil of lens assembly 18 and directs the light image thereof through the point 10, where the light image is modulated by the color content of the point 10, and to the plane 22 of the reflecting device 24 regardless of the scanning position of point 10 in the frame 12.

Further information regarding the operation of exit pupils of lens systems may be obtained from the treatise *Modern Optical Engineering The Design of Optical Systems* by Warren J. Smith published by McGraw-Hill Book Company.

The reflecting device 24 is operative to separate the illuminated complete image of the exit pupil of lens assembly 18 modulated by the color of the point 10 into at least three partial or component images and to direct the three partial images in the paths indicated by the numerals 26, 28 and 30 upon three respective filtered photoreceptors.

The filtered photoreceptors may include filters 32, 34 and 36, each selected to transmit a predetermined wave length of light corresponding to a primary color. The predetermined color components of the filters 32, 34 and 36 may, for example, be generally described as the green, red and blue primary color components, respectively. The light transmitted by each of the filters 32, 34 and 36 is imaged by respective condenser lens 38, 40 and 42 onto photosensitive devices 44, 46 and 48, respectively. The filtered light striking the surface of the photosensitive devices 44, 46 and 48 is translated thereby into electrical signals, the magnitude of which are dependent upon the intensity of filtered light striking the three respective photosensitive devices. The electrical signals may thereafter be modified and otherwise made suitable for communication to further apparatus for the reproduction of the illuminated image retained in the image frame of the motion picture film 10 as disclosed in the aforementioned U.S. Pat. Nos. 2,776,335 and 2,808,456, or otherwise employed, and further description of such apparatus is deemed unnecessary.

The partial images reflected by the surfaces 50, 52 and 54 of the reflective device 24 in the paths 26, 28 and 30, respectively are focused on the condenser lens 38, 40 and 42 which cooperate with the respective reflective surfaces 50, 52 and 54 to image the reflected portion of the exit pupil of lens 20 upon the photosensitive surfaces of the photosensitive devices 44, 46 and 48. Therefore, regardless of the position of the scanned point 10, the three partial images are always focused upon the entire area of the photosensitive surfaces of the photosensitive devices 44, 46 and 48.

The reflective device 24 as depicted in FIG. 1, consists of three arcuate reflective surfaces 50, 52 and 54 having separate focal points disposed with respect to each other and the plane 22 to separate the illuminated complete image focused thereon into three partial images of reduced intensity and to reflect the separated partial images in the aforementioned light paths 26, 28 and 30.

Figure 2:
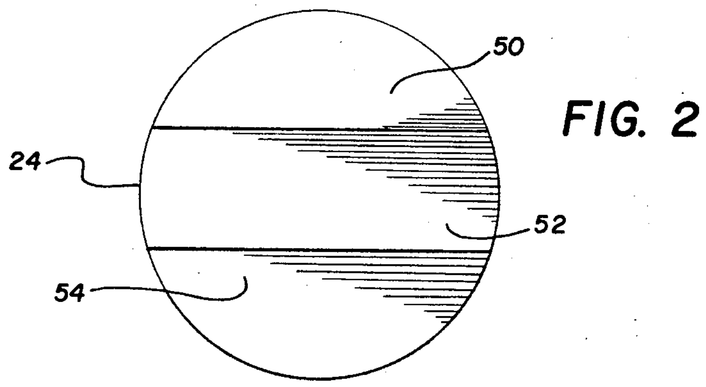
FIG. 2 is a frontal view of the reflecting surfaces of the separating device in accordance with the invention.

Referring now to FIG. 2, there is shown a frontal view of the reflecting device and the three arcuate reflective surfaces 50, 52 and 54. The illuminated complete image of the color modulated light formed on the reFlective device 24 by the lens 20 fills the circular area of the reflective device 20. The arcuate reflective surfaces 50, 52 and 54 may be mirror surfaces that roughly approximate rectangles which correspond to the shape of the photosensitive surfaces of the photosensitive devices 44, 46 and 48. The relative areas of the three surfaces 50, 52 and 54 may be adjusted to compensate for the spectral sensitivity of the photosensitive devices 44, 46 and 48. For example, the arcuate mirror surface 52 has the largest surface area, and it may correspond to the red sensitive photosensitiVe device 46 which iS usually least sensitive of the three photosensitive devices.

Since the purpose of the reflective device 24 is to separate the illuminated complete image focused thereon into three partial images and to separate the partial images in separate paths, the mirror surfaces of the arcuate sections 50, 52, and 54 need not be of high optical quality. Thus, it may be expected that the reflective device 24 would be relatively less expensive and more compact than two dichroic mirror filters such as are employed in the aforementioned U.S. Pat. Nos. 2,776,335 and 2,808,456.

From the description of the preferred embodiment set forth above, it is apparent that the invention can be practiced in many alternative ways. For example, the apparatus of FIG. 1 could be employed in conjunction with a camera system for determining the color composition of a naturally or artificially illuminated scene. Also, it is apparent that the filters and the photoresponsive devices of FIG. 1 may have any chosen spectral absorption.

As may be seen a novel system has been disclosed for separating the color components of an illuminated image and collecting the separated color components for translation into respective electrical signals without the use of expensive and bulky color filters.

The invention has been described in detail with particular reference to preferred embodiments thereof, but it will be understood that variations and modifications can be effected within the spirit and scope of the invention.

We Claim:

1. In apparatus for generating a plurality of electrical signals representative of the color composition of an illuminated image frame of motion picture film, the combination comprising:
   a. means for positioning each image frame of the motion picture film in a first plane;
   b. means for scanning, in a predetermined pattern, every elementary point of each image frame in said first plane with a beam of light, said beam of light being transmitted by the scanned elementary points of the image frame and being modulated in color thereby;
   c. a plurality of arcuate mirror surfaces, adapted to reflect a partial unfocused image of the color modulated beam of light in a corresponding predetermined path, said arcuate mirror surfaces being mounted on a support located in a second plane parallel to said first plane for reflecting light incident on the arcuate shaped mirrors into a corresponding plurality of paths;

d. lens means for directing an unfocused image of the beam of light modulated in color by each scanned elementary point of said image frame upon said plurality of light reflective means, whereby a plurality of partial unfocused images of the modulated beam are reflected into the corresponding plurality of paths by the corresponding plurality of reflective means; and e. a plurality of color sensitive means corresponding to and located in said plurality of respective paths, each color sensitive means selectively responsive to a predetermined color of light in the partial unfocused image of the modulated beam reflected by said plurality of reflective means for producing an electrical signal representative of the predetermined color of the scanned elementary point of the image frame.

2. The apparatus of claim 1, wherein said lens means comprises a first lens assembly adapted to receive the beam of light from said scanning means and to direct said beam through each scanned elementary point of said image frame, said first lens assembly having an exit pupil through which the said beam is directed, and a second lens assembly for directing an unsharp image of the exit pupil of said first lens assembly, and the unfocused image of said beam of light passing through and modulated in color by each scanned elementary point, upon said plurality of light reflective means whereby an unfocused image of the color modulated beam of light transmitted by every scanned elementary point of the image frame is directed upon said plurality of reflective means.

3. In apparatus for generating first, second and third electrical signals representative of the respective red, blue and green color composition of an illuminated image frame of motion picture film, the combination comprising:

a. means for positioning each image frame of the motion picture film in a first plane;

b. means for scanning, in a predetermined pattern, every elementary point of each image frame in said first plane with a beam of white light, said beam of light being transmitted by the scanned elementary points of the image frame and being modulated in color thereby;

c. first, second and third arcuate mirror surfaces adapted to reflect a partial unfocused image of the color modulated beam of light in a corresponding distinct path, said arcuate mirror surfaces being mounted on a support located in a second plane parallel to said first plane, each arcuate shaped mirror surface having at least one reflective point intersecting said second plane for reflecting light incident on the accurate shaped mirror surfaces into corresponding first, second and third distinct paths;

d. lens means for forming and directing an unfocused image of the color modulated beam of light upon said first, second and third reflective means whereby respective first, second and third partial unfocused images of said color modulated beam are reflected into the corresponding first, second and third distinct paths; and e. red, blue and green color sensitive means located in said first, second and third distinct paths, respectively, for respectively producing first, second and third electrical signals representative of the red, blue and green color content, respectively, of each scanned elementary point of the image frame.

4. The apparatus of claim 3 wherein said lens means comprises a first lens assembly adapted to receive the beam of light from said scanning means and to direct said beam through each elementary point of said image frame, said first lens assembly having an exit pupil through which said beam is directed, and a second lens assembly for directing an unsharp image of the exit pupil of said first lens assembly, and the unfocused image of said beam of light passing through and modulated in color by each scanned elementary point upon said plurality of light reflective means whereby an unfocused image of the color modulated beam of light transmitted by every scanned elementary point of the image frame is directed upon said plurality of reflective means.

* * * * *